United States Patent
Norton et al.

(10) Patent No.: US 11,643,986 B2
(45) Date of Patent: May 9, 2023

(54) MULTI-FUEL SYSTEM AND METHOD

(71) Applicant: Transportation IP Holdings, LLC, Norwalk, CT (US)

(72) Inventors: Daniel George Norton, Niskayuna, NY (US); Adam Edgar Klingbeil, Ballston Lake, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/454,204

(22) Filed: Nov. 9, 2021

(65) Prior Publication Data
US 2022/0065181 A1 Mar. 3, 2022

Related U.S. Application Data

(60) Continuation-in-part of application No. 16/942,516, filed on Jul. 29, 2020, which is a division of
(Continued)

(51) Int. Cl.
*F02D 41/00* (2006.01)
*F02D 19/08* (2006.01)
*F02D 29/02* (2006.01)

(52) U.S. Cl.
CPC ....... *F02D 41/0027* (2013.01); *F02D 19/081* (2013.01); *F02D 29/02* (2013.01);
(Continued)

(58) Field of Classification Search
CPC .... F02D 41/0027; F02D 19/081; F02D 29/02; F02D 41/0025; F02D 2200/0625; F02D 2200/701; Y02T 10/30
(Continued)

(56) References Cited

U.S. PATENT DOCUMENTS 4,402,212 A * 9/1983 Childs ................ G01N 33/2817
73/35.02
4,495,930 A * 1/1985 Nakajima ........... F02D 41/0025
123/1 A
(Continued)

FOREIGN PATENT DOCUMENTS

CN 1701169 A 11/2005
CN 101201020 A 6/2008
(Continued)

OTHER PUBLICATIONS

Kessels, J. et al., "Integrated Energy & Emission Management for Hybrid Electric Truck with SCR aftertreatment," 2010 IEEE Vehicle Power and Propulsion Conference, Sep. 1, 2010, Lille, France, 6 pages.
(Continued)

*Primary Examiner* — Logan M Kraft
*Assistant Examiner* — John D Bailey
(74) *Attorney, Agent, or Firm* — McCoy Russell LLP (57) ABSTRACT

A method provides for operating an engine configured to use a plurality of differing fuels. The method includes determining a fuel combustion ratio of the plurality of differing fuels associated with at least one engine cylinder of the engine based at least in part on one or more of a plurality of characteristic profiles. This maintains one or more of a plurality of actual values associated with usage of the plurality of differing fuels relative to defined corresponding threshold values. The fuel combustion ratio includes a ratio of the plurality of differing fuels to be delivered to the at least one engine cylinder. A fuel delivery system delivers the plurality of differing fuels to the at least one engine cylinder based on the fuel combustion ratio.

18 Claims, 4 Drawing Sheets

Related U.S. Application Data application No. 15/095,388, filed on Apr. 11, 2016, now abandoned, and a continuation-in-part of application No. 15/013,432, filed on Feb. 2, 2016, now abandoned, said application No. 15/095,388 is a continuation-in-part of application No. 14/251,726, filed on Apr. 14, 2014, now Pat. No. 9,309,819, which is a continuation-in-part of application No. PCT/US2012/064929, filed on Nov. 14, 2012, said application No. 15/013,432 is a continuation-in-part of application No. 13/484,621, filed on May 31, 2012, now Pat. No. 9,249,744, said application No. PCT/US2012/064929 is a continuation of application No. 13/328,438, filed on Dec. 16, 2011, now Pat. No. 8,682,512.

(52) U.S. Cl.
CPC .. *F02D 41/0025* (2013.01); *F02D 2200/0625* (2013.01); *F02D 2200/701* (2013.01); *Y02T 10/30* (2013.01)

(58) Field of Classification Search
USPC .......................................................... 701/103
See application file for complete search history.

(56) References Cited

U.S. PATENT DOCUMENTS

| | | | | |
|---|---|---|---|---|
| 5,560,326 A * | 10/1996 | Merritt | ............... | F02B 75/02 123/259 |
| 5,713,328 A * | 2/1998 | Anderson | ............... | F02D 33/00 123/299 |
| 5,875,743 A * | 3/1999 | Dickey | ............... | F02B 1/12 123/568.21 |
| 5,890,459 A * | 4/1999 | Hedrick | ............... | F02M 21/0275 123/526 |
| 5,911,210 A * | 6/1999 | Flach | ............... | F02D 19/081 123/527 |
| 6,101,986 A * | 8/2000 | Brown | ............... | F02D 41/0025 123/525 |
| 6,276,334 B1 * | 8/2001 | Flynn | ............... | F02B 29/00 701/102 |
| 6,484,088 B1 * | 11/2002 | Reimer | ............... | B60K 15/077 701/123 |
| 6,543,395 B2 * | 4/2003 | Green | ............... | F02M 23/03 123/526 |
| 6,907,870 B2 | 6/2005 | zur Loye et al. | | |
| 6,912,992 B2 * | 7/2005 | Ancimer | ............... | F02D 41/403 123/299 |
| 6,951,202 B2 * | 10/2005 | Oda | ............... | F02D 19/0665 123/305 |
| 7,019,626 B1 * | 3/2006 | Funk | ............... | F02D 19/0623 60/740 |
| 7,044,103 B2 | 5/2006 | May | | |
| 7,107,942 B2 * | 9/2006 | Weissman | ............... | F02D 19/0649 123/1 A |
| 7,222,015 B2 * | 5/2007 | Davis | ............... | F02D 19/027 701/104 |
| 7,387,091 B2 * | 6/2008 | Ritter | ............... | F02D 19/0631 123/672 |
| 7,503,312 B2 * | 3/2009 | Surnilla | ............... | F02D 41/3029 123/406.25 |
| 7,509,209 B2 | 3/2009 | Davis et al. | | |
| 7,533,634 B2 * | 5/2009 | Ritter | ............... | F02D 35/027 123/525 |
| 7,549,408 B2 * | 6/2009 | Russell | ............... | F02D 13/06 123/481 |
| 7,556,030 B2 * | 7/2009 | Ashida | ............... | F02M 37/0064 123/577 |
| 7,640,913 B2 * | 1/2010 | Blumberg | ............... | F02D 19/12 123/304 |
| 7,740,000 B2 * | 6/2010 | He | ............... | F02D 35/023 123/299 |
| 7,772,970 B2 * | 8/2010 | Masuda | ............... | F02D 11/105 701/99 |
| 7,861,518 B2 * | 1/2011 | Federle | ............... | F01N 3/208 701/123 |
| 7,913,664 B2 | 3/2011 | Williams et al. | | |
| 7,983,831 B2 * | 7/2011 | Tsunooka | ............... | F02D 19/0665 123/576 |
| 8,006,677 B2 | 8/2011 | Williams et al. | | |
| 8,032,294 B2 * | 10/2011 | Loeffler | ............... | F02D 35/02 701/111 |
| 8,037,850 B2 * | 10/2011 | Pursifull | ............... | F02D 41/3094 123/3 |
| 8,402,939 B2 * | 3/2013 | Reuss | ............... | F02D 35/023 701/111 |
| 8,555,702 B2 * | 10/2013 | Sgatti | ............... | A61B 8/4455 73/114.01 |
| 8,584,657 B2 * | 11/2013 | Yagi | ............... | F02D 19/0634 123/1 A |
| 8,733,298 B2 * | 5/2014 | Haskara | ............... | F02D 41/0025 123/698 |
| 8,893,691 B2 * | 11/2014 | Payne | ............... | F02D 19/0652 123/575 |
| 9,157,385 B2 | 10/2015 | Gallagher et al. | | |
| 9,249,744 B2 | 2/2016 | Klingbeil | | |
| 9,334,841 B1 * | 5/2016 | Jackson | ............... | F02D 19/0694 |
| 10,344,687 B2 * | 7/2019 | Gallagher | ............... | F02D 19/081 |
| 2002/0007816 A1 * | 1/2002 | Zur Loye | ............... | F02B 1/04 123/305 |
| 2003/0037978 A1 * | 2/2003 | Hofbauer | ............... | B60W 20/40 180/68.5 |
| 2003/0069684 A1 * | 4/2003 | Reimer | ............... | G01F 23/296 701/123 |
| 2003/0221661 A1 * | 12/2003 | Willi | ............... | F02D 41/403 123/304 |
| 2004/0182378 A1 * | 9/2004 | Oshimi | ............... | F02D 19/088 123/685 |
| 2006/0032477 A1 * | 2/2006 | May | ............... | F02D 41/3094 123/304 |
| 2006/0102145 A1 * | 5/2006 | Cohn | ............... | F02B 7/00 123/406.29 |
| 2007/0079647 A1 * | 4/2007 | Aoyama | ............... | F02D 19/0636 73/35.02 |
| 2007/0095331 A1 * | 5/2007 | Ayame | ............... | F02D 41/0025 123/491 |
| 2007/0119425 A1 * | 5/2007 | Lewis | ............... | F02D 19/0636 123/492 |
| 2007/0137514 A1 * | 6/2007 | Kumar | ............... | F02D 41/021 105/35 |
| 2007/0175459 A1 * | 8/2007 | Williams | ............... | F02D 19/0694 123/515 |
| 2007/0247291 A1 * | 10/2007 | Masuda | ............... | F02D 11/105 340/439 |
| 2007/0295316 A1 | 12/2007 | Davis et al. | | |
| 2008/0053399 A1 * | 3/2008 | Bromberg | ............... | F02D 19/081 123/304 |
| 2008/0096726 A1 * | 4/2008 | Riley | ............... | A61B 5/1118 482/8 |
| 2008/0098726 A1 * | 5/2008 | Donaldson | ............... | F02D 41/401 60/286 |
| 2008/0110161 A1 * | 5/2008 | Persson | ............... | F02M 26/05 60/299 |
| 2008/0121136 A1 * | 5/2008 | Mari | ............... | B60L 50/61 303/151 |
| 2008/0262701 A1 * | 10/2008 | Williams | ............... | F02D 19/0676 705/14.27 |
| 2009/0025695 A1 * | 1/2009 | Wolber | ............... | F02D 19/061 123/527 |
| 2009/0271090 A1 * | 10/2009 | Surnilla | ............... | F02D 19/0615 701/103 |
| 2009/0292444 A1 * | 11/2009 | Russell | ............... | F02D 35/027 123/575 |
| 2010/0162678 A1 * | 7/2010 | Annigeri | ............... | F02C 3/22 60/39.463 |

(56) References Cited

U.S. PATENT DOCUMENTS

| | | | |
|---|---|---|---|
| 2011/0015856 A1* | 1/2011 | Arnold | G01C 21/3611 704/E13.011 |
| 2011/0079197 A1* | 4/2011 | Stewart | F02D 35/023 123/399 |
| 2011/0088654 A1* | 4/2011 | Courtoy | F02D 19/0655 123/299 |
| 2011/0114058 A1* | 5/2011 | Cohn | F02B 43/00 123/436 |
| 2011/0118914 A1* | 5/2011 | Brooks | B61L 27/16 701/19 |
| 2011/0132323 A1* | 6/2011 | Surnilla | F02D 19/081 123/406.19 |
| 2011/0137470 A1* | 6/2011 | Surnilla | G01C 21/26 700/282 |
| 2011/0184629 A1* | 7/2011 | Krengel | F02D 19/061 123/304 |
| 2011/0209459 A1* | 9/2011 | Hancu | F01N 3/0821 60/274 |
| 2011/0257869 A1* | 10/2011 | Kumar | B61L 25/025 701/103 |
| 2011/0288738 A1* | 11/2011 | Donnelly | F02D 19/0647 701/99 |
| 2011/0288744 A1* | 11/2011 | Gokhale | F02D 41/0007 701/102 |
| 2011/0288751 A1* | 11/2011 | Kurtz | F02D 19/0647 701/109 |
| 2012/0109496 A1* | 5/2012 | Hylands | F02D 19/105 701/103 |
| 2012/0145122 A1* | 6/2012 | Kurtz | F02B 3/08 123/299 |
| 2012/0158269 A1* | 6/2012 | Nakayama | F01N 11/00 701/103 |
| 2012/0272935 A1* | 11/2012 | Magnusson | F02D 19/061 123/299 |
| 2012/0325180 A1* | 12/2012 | Montgomery | F02D 19/0694 123/299 |
| 2012/0325350 A1* | 12/2012 | Kim | F02D 41/0025 239/584 |
| 2013/0025573 A1* | 1/2013 | Klingbeil | F02D 19/0692 123/525 |
| 2013/0054116 A1* | 2/2013 | Lepley | F02D 41/0025 701/104 |
| 2013/0158752 A1* | 6/2013 | Norton | F02D 19/0647 701/19 |
| 2013/0158848 A1* | 6/2013 | Gallagher | F02D 29/02 701/123 |
| 2013/0325295 A1* | 12/2013 | Klingbeil | F02D 41/0025 701/104 |
| 2014/0069384 A1* | 3/2014 | Suzuki | F02D 41/403 123/445 |
| 2014/0261345 A1* | 9/2014 | Bromberg | F02B 51/00 123/575 |
| 2015/0377153 A1* | 12/2015 | Gallagher | F02D 29/02 123/575 |
| 2016/0153375 A1* | 6/2016 | Klingbeil | F02D 41/0027 123/577 |
| 2018/0223746 A1* | 8/2018 | Mack | F02B 73/00 |

FOREIGN PATENT DOCUMENTS

| | | |
|---|---|---|
| CN | 102400797 A | 4/2012 |
| DE | 19922748 A1 | 11/2000 |
| DE | 102004051287 A1 | 4/2006 |
| DE | 102006020223 B3 | 8/2007 |
| DE | 102010036131 A1 | 3/2012 |
| EP | 2336529 A2 | 6/2011 |
| JP | 2000145488 A | 5/2000 |
| JP | 2004108153 A | 4/2004 |
| JP | 2008274954 A | 11/2008 |
| JP | 2010065604 A | 3/2010 |
| RU | 2136918 C1 | 9/1999 |
| WO | 9421911 A1 | 9/1994 |
| WO | 03076788 A1 | 9/2003 |
| WO | 2007092711 A2 | 8/2007 |
| WO | 2011128692 A1 | 10/2011 |
| WO | 2011153069 A1 | 12/2011 |

OTHER PUBLICATIONS

Qian, D. et al., "Research of the Influence of Combustion Chamber Structure on Performance of Dual Fuel Engine," 2011 International Conference on Electric Information and Control Engineering (ICEICE), Apr. 15, 2011, Wuhan, China, 3 pages.

ISA European Patent Office, International Search Report and Written Opinion Issued in Application No. PCT/US2012/064929, dated Mar. 6, 2013, WIPO, 10 pages.

ISA European Patent Office, International Search Report and Written Opinion Issued in Application No. PCT/US2013/047501, dated Nov. 6, 2013, WIPO, 12 pages.

Great Britain Intellectual Property Office, Combined Search and Examination Report under Sections 17 & 18(3) Issued in Application No. GB1309361.2, dated Nov. 25, 2013, 3 pages.

Mellde, R. et al., "Advanced automobile engines for fuel economy, low emissions, and multifuel capability," Annual Review of Energy, vol. 14. Jan. 1989, 20 pages.

\* cited by examiner

MULTI-FUEL SYSTEM AND METHOD

CROSS-REFERENCE TO RELATED APPLICATIONS

The present application is a continuation-in-part of U.S. Non-Provisional application Ser. No. 16/942,516, entitled "MULTI-FUEL SYSTEM AND METHOD," filed on Jul. 29, 2020. U.S. Non-Provisional application Ser. No. 16/942,516 is a divisional of U.S. Non-Provisional application Ser. No. 15/095,388, entitled "MULTI-FUEL SYSTEM AND METHOD," filed on Apr. 11, 2016. U.S. Non-Provisional application Ser. No. 15/095,388 is a continuation-in-part of U.S. Non-Provisional patent application Ser. No. 14/251,726, entitled, MULTI-FUEL SYSTEM AND METHOD, filed on Apr. 14, 2014, now U.S. Pat. No. 9,309,819. U.S. Non-Provisional patent application Ser. No. 14/251,726 is a continuation-in-part of International Application No. PCT/US2012/064929, entitled "FUEL OPTIMIZING SYSTEMS FOR A MOBILE ASSET, AND A RELATED METHOD THEREOF," filed on Nov. 14, 2012.

International Application No. PCT/US2012/064929 is a continuation of U.S. application Ser. No. 13/328,438, entitled, "FUEL OPTIMIZING SYSTEM FOR A MOBILE ASSET, AND A RELATED METHOD THEREOF," filed on Dec. 16, 2011, now U.S. Pat. No. 8,682,512. U.S. Non-Provisional application Ser. No. 16/942,516 is also a continuation-in-part of U.S. Non-Provisional patent application Ser. No. 15/013,432, entitled "METHOD FOR OPERATING AN ENGINE," filed on Feb. 2, 2016. U.S. Non-Provisional patent application Ser. No. 15/013,432 is a continuation-in-part of U.S. Non-Provisional patent application Ser. No. 13/484,621, entitled "METHOD FOR OPERATING AN ENGINE," filed on May 31, 2012, now U.S. Pat. No. 9,249,744. The entire contents of each of the above-referenced applications are hereby incorporated by reference for all purposes.

BACKGROUND

Technical Field

Aspects of the invention relate to a multi-fuel system for engines and an associated method of operation.

Discussion of Art

Some mobile assets may have engines, for example, compression-ignition engines operate by directly injecting a fuel (e.g., diesel fuel) into compressed air in one or more piston-cylinder assemblies, such that the heat of the compressed air ignites the fuel-air mixture. The direct fuel injection atomizes the fuel into droplets, which evaporate and mix with the compressed air in the combustion chambers of the piston-cylinder assemblies. The fuel-air ratio affects engine performance, efficiency, exhaust constituents, and other engine characteristics. Exhaust emissions may include carbon oxides (e.g., carbon monoxide), nitrogen oxides (NOx), sulfur oxides (SOx), and particulate matter (PM). The amount and relative proportion of these constituents may vary in response to changes in the fuel-air mixture, fuel quality, compression ratio, injection timing, environmental conditions (e.g., atmospheric pressure, temperature, etc.), and so forth.

A multi-fuel engine is an alternative internal combustion engine configured to run on more than one fuel, for example, natural gas and diesel, each stored in separate vessels. Such engines are capable of burning a mixture of the resulting blend of fuels in the combustion chamber and the fuel injection or spark timing may be adjusted according to the blend of fuels in the combustion chamber. For multi-fuel operation where one of the fuel is premixed with air, a reduction in nitrogen oxide ($NO_x$) and particulate matter (PM) emissions is enabled by combusting a relatively larger fraction of the premixed fuel. It may be desirable to have a system and method for engines operating on more than one fuel that differs from those currently available.

BRIEF DESCRIPTION

In accordance with one embodiment, a method is provided for operating a multi-fuel engine configured to use a plurality of differing fuels. The method includes determining a fuel combustion ratio of the plurality of differing fuels associated with at least one engine cylinder of the engine based at least in part on one or more of a plurality of characteristic profiles. This is to maintain one or more of a plurality of actual values associated with usage of the plurality of differing fuels relative to defined corresponding threshold values. The fuel combustion ratio includes a ratio of the plurality of differing fuels to be delivered to the at least one engine cylinder. A fuel delivery system delivers the plurality of differing fuels to the at least one engine cylinder based on the fuel combustion ratio.

In one embodiment, a fuel system is provided that includes a fuel controlling unit. The fuel controlling unit delivers a plurality of fuels to at least one engine cylinder of an engine based at least in part on a fuel combustion ratio. The fuel combustion ratio comprises a ratio of the plurality of fuels to be delivered to the at least one engine cylinder and is based at least in part on one or more of a plurality of characteristic profiles. The fuel controlling unit maintains one or more of a plurality of actual values associated with usage of the plurality of fuels relative to defined corresponding threshold values.

In one embodiment, an engine is disposed within a mobile asset operable to travel along a defined path. A global positioning sensor provides, and the fuel controlling unit receives from the global positioning sensor, location information and thereby determines the one or more of the plurality of characteristic profiles as a function of time and a corresponding location of the mobile asset along the defined path.

DRAWINGS

These and other features and aspects of the invention may be understood when the following detailed description is read with reference to the accompanying drawings in which like characters represent like parts throughout the drawings, wherein.

DETAILED DESCRIPTION

In accordance with the embodiments discussed herein, a method and a fuel system for use operating an engine using a plurality of fuels is disclosed. The engine may power or propel a stationary asset or a mobile asset.

A suitable mobile asset can be a vehicle or other engine powered assembly. Suitable vehicles may include locomotives, passenger and non-passenger automotive vehicles, hybrid vehicles, off-highway vehicles, on-road vehicles (such as tractor trailers), tracked vehicles, air-borne vehicles, rail vehicles, mining vehicles, industrial and construction vehicles, and marine vessels. Suitable mobile assets may include a multi-fuel engine configured to combust two or more of combust one or more of gasoline, diesel, hydrogenation-derived renewable diesel (HDRD), alcohol, ammonia, biodiesels, hydrogen, natural gas, kerosene, syn-gas, propane, ethers, and the like. In one example, the multi-fuel engine may combust a primary fuel and a secondary fuel, wherein the primary fuel may be a liquid fuel and the secondary fuel may be a gaseous fuel. Additionally or alternatively, the primary fuel may be a higher carbon content fuel and the secondary fuel may be a lower carbon content or carbon free fuel. In one example, the primary fuel may be gasoline, diesel, HDRD, or the like. The secondary fuel may include one or more of hydrogen, natural gas, alcohol, ammonia, and the like.

A mobile asset's configuration may include performance variables such as the peak output rating of the mobile asset, the correlation between the power level settings and the percentage of full power generated, engine emissions curves, acoustic emissions, electro-magnetic emissions, the number of traction motors used, fuel economy performance, adhesion limits, the organization, presentation and functionality of operator controls, communications protocol, auxiliary functions, security measures, and the like. External factors that can affect the mobile asset's desired configuration can include tax liabilities for operation, weather considerations, degradation risk (due to crime or conflict), proximity to population centers, and the like. The control of fuel usage may be determined with reference to various characteristic profiles associated with the engine operation and/or mobile asset and may vary as a function of time and a corresponding location of the asset along the path.

A reduction in nitrogen oxide ($NO_x$) and particulate matter (PM) emissions may be enabled by combusting a relatively larger fraction of premixed fuel. Relative costs and availability of different fuels may be in flux. For example, in some embodiments, diesel and natural gas may be utilized to drive the engine. If the cost of diesel increases relative to the cost of the natural gas or another secondary fuel, more natural gas may be used resulting in reduced cost and emissions. If the cost of natural gas increases relative to the cost of the diesel, then more diesel may be used to drive the engine. It will be appreciated that the utilization of various secondary fuels may be balanced based on costs relative to one another and the primary fuel.

The term "profiles" is used herein to describe the overall operating parameters and conditions of the engine and/or mobile asset. These profiles may alter the manner in which the operating systems of the mobile asset can be controlled in response to operational inputs.

Figure 1:
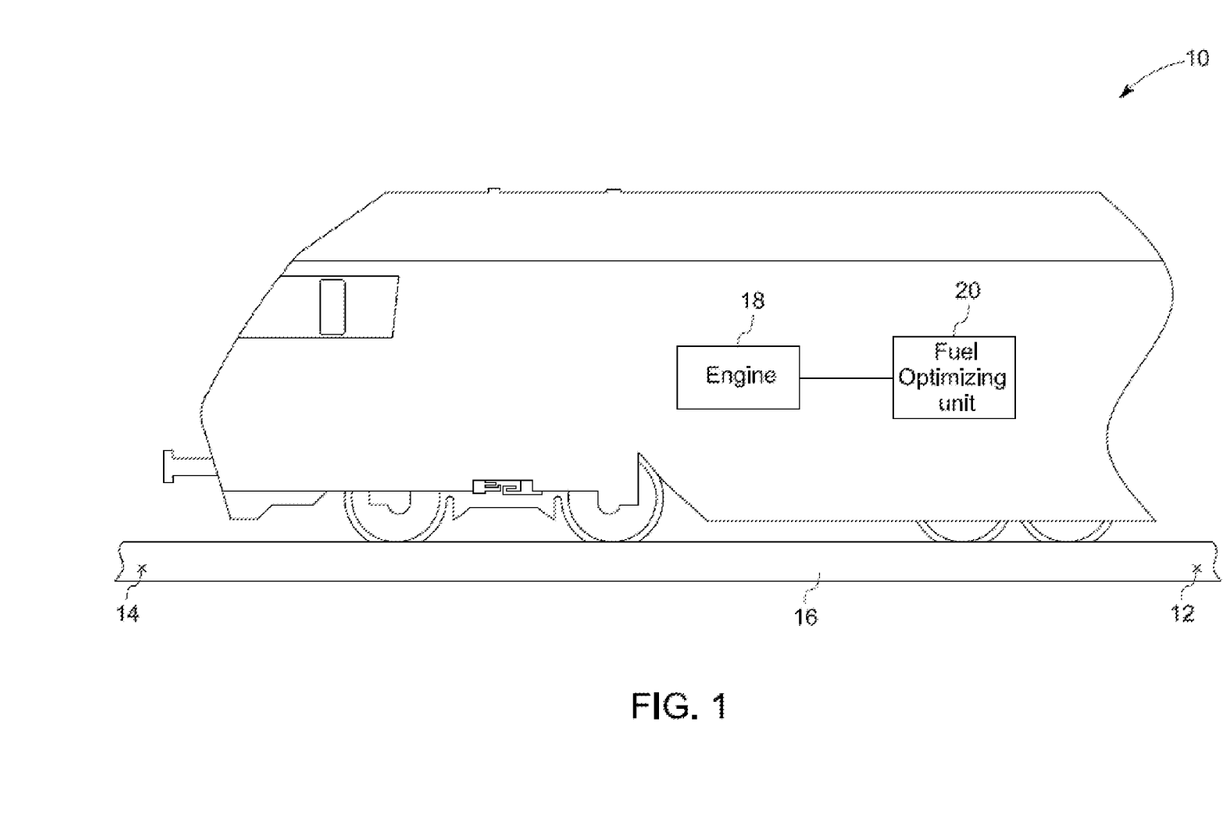
FIG. 1 is a diagrammatical representation of a mobile asset, for example a locomotive, having a fuel controlling unit in accordance with an exemplary embodiment of the present invention.

Referring to FIG. 1, a mobile asset 10 moving from a first operating point 12 to a second operating point 14 along a defined path 16 is disclosed. In the illustrated embodiment, the mobile asset may be driven by an engine 18 using a plurality of fuels. A fuel controlling unit 20 may control fuel utilization based on cost and availability while ensuring emission compliance along the travel from the first operating point to the second operating point along the defined path.

Figure 2:
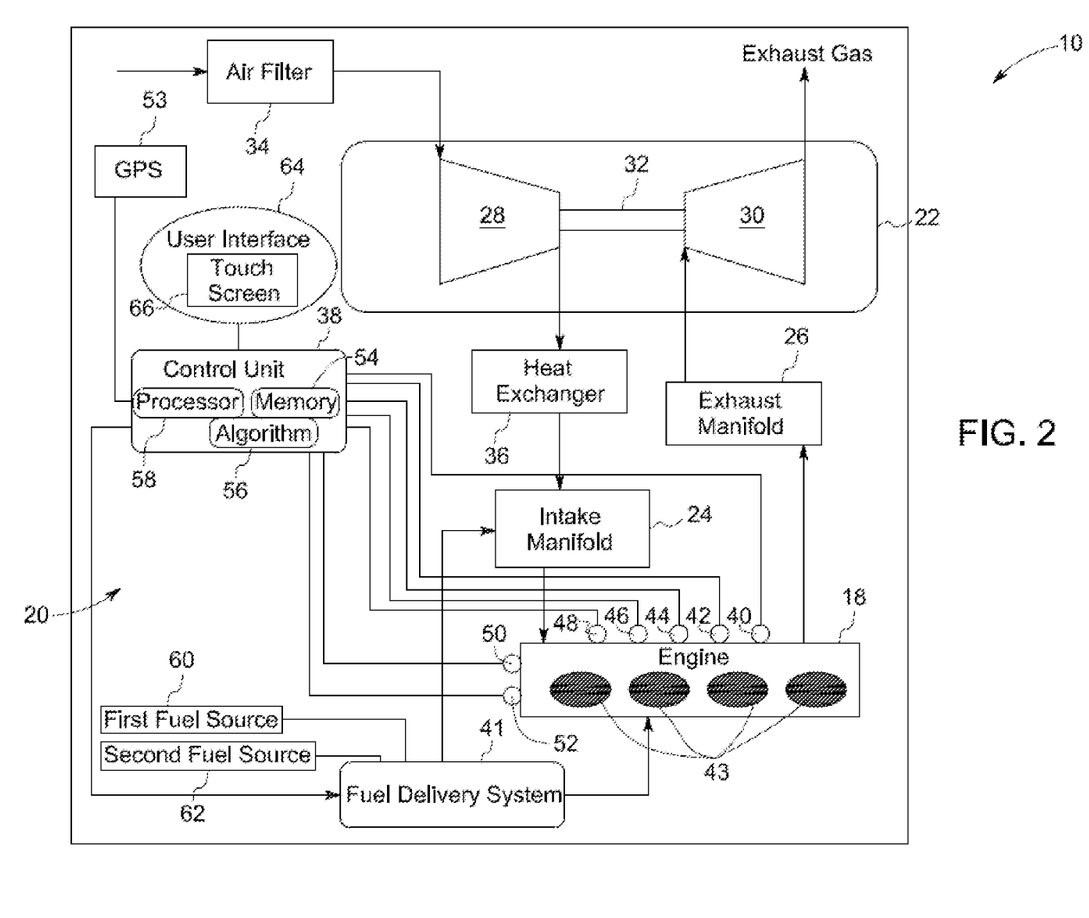
FIG. 2 is a diagrammatical representation of a mobile asset with detailed view of a fuel controlling unit in accordance with an exemplary embodiment of the present invention.

Referring to FIG. 2, the mobile asset includes a turbocharger 22 and the compression-ignition engine, e.g. the diesel engine. A motor-generator unit (not shown) may be mechanically coupled to the turbocharger. As discussed in further detail below, embodiments of the technique provide monitoring and control features, such as sensors and control logic, to control the utilization of fuel.

The illustrated engine includes an air intake manifold 24 and an exhaust manifold 26. The turbocharger may include a compressor 28 and a turbine 30 and may be operated to supply compressed air to the intake manifold for combustion within the engine. The turbine may be coupled to the exhaust manifold for extracting energy from exhaust gases for rotating a turbocharger shaft 32 connected to the compressor. The compressor draws ambient air through a filter 34 and provides compressed air to a heat exchanger 36. The temperature of air may be increased due to compression. The compressed air flows through the heat exchanger such that the temperature of air may be reduced prior to delivery into the intake manifold of the engine. In one embodiment, the heat exchanger may be an air-to-water heat exchanger, which utilizes a coolant to facilitate removal of heat from the compressed air. In another embodiment, the heat exchanger may be an air-to-air heat exchanger, which utilizes ambient air to facilitate removal of heat from compressed air. The fuel controlling unit may be used for another type of engine or mobile asset using a plurality of fuels so as to control fuel utilization based on cost and availability while ensuring emission compliance during travel.

The fuel controlling unit may include a plurality of sensors and a control unit 38. Suitable sensors may include one or more of an engine emission level sensor 40, a fuel usage level sensor 42, a power output sensor 44, an engine load sensor 46, an engine speed sensor 48, fuel cost meter 50, a fuel injection profile sensor 52, a knock sensor (not shown), an oxygen content sensor (not shown), temperature sensors (not shown), pressure sensors (not shown), a valve sensor (not shown), and the like. A global positioning sensor (GPS) 53 may communicate with the fuel controlling unit.

A suitable control unit may be an electronic fuel injection control unit for the engine or an electronic logic control unit that may be programmable by a user. The control unit may produce a signal to control operation of a fuel delivery system 41. The fuel delivery system may have one or more fuel injection pumps, gas control valves, a communication path to regasification unit (which, in one embodiment, may be located on another mobile asset coupled to the mobile asset that supports the engine and the fuel controlling unit), a gas recirculation pump, and the like. The fuel injection pumps may provide fuel, under pressure, to a plurality of plurality of fuel injectors for injecting fuel into a cylinder of the engine.

The plurality of fuel injectors may include port-injectors and direct injectors for injecting various types of fuels. In one example, each type of fuel may include a pair of corresponding port-injectors and direct injectors. For example, if the multi-fuel engine is configured to combust at least a primary fuel and a secondary fuel, then the multi-fuel engine may include primary fuel port-injector and direct injector and a secondary fuel port-injector and direct injector. Additionally or alternatively, the multi-fuel engine may be configured to combust additional types of secondary fuels. In such an example, the secondary fuel port-injector and direct injector may be configured to inject multiple types of secondary fuels separately. During some conditions, one or more secondary fuels may be mixed and injected into one or more of the plurality of cylinders. During some conditions, additionally or alternatively, one or more secondary fuels may be injected into one or more of the plurality of cylinders separately, and mixed therein. In other embodiments, a number of port-injectors and/or direct injectors per cylinder may correspond to a number of secondary fuels in which the multi-fuel engine is configured to combust during a single engine cycle. For example, if a cylinder includes three port injectors, then the cylinder may be configured to receive two secondary fuels via port injection and the primary fuel via port-injection.

A piston may be slidably disposed in each cylinder and reciprocates between a top dead center and a bottom dead center position. The control unit may receive an engine emission level signal from the level sensor, a fuel usage level signal from the sensor, a power output signal from the power sensor, an engine load signal from the load sensor, an engine speed signal from the speed sensor, fuel cost from the meter, and a fuel injection profile signal from the injection sensor.

The control unit may receive one or more signals associated with at least one of a distance from the first operating point to the second operating point along the defined path, terrain profile associated with the path, ambient temperature and pressure, time required to traverse the distance, and location of one or more fuel stations along the defined path from the GPS unit. The terrain profile can include information relating to the path, such as the grade, the curvature, the altitude, and the path condition. Path condition can include the state of repair or wear of the path, for example the condition of rail track.

The control unit may include a memory 54, an algorithm 56, and a processor 58. The memory may store information associated with the mobile asset, the path, the engine, environmental conditions (such as snow during a winter or leaf cover in the fall), and the like. The memory may store information relating to average temperatures and pressures associate with either the ambient or of operations of the engine. Other stored information may include maps, tables and models relating to, for example, fuel injection timing and pressure, engine speed, power output of the engine, engine emission level, fuel usage level, engine load, fuel cost, distance from the first operating point to the second operating point along the defined path, terrain profile associated with the path, ambient temperature and pressure, time required to traverse the distance, and location of one or more fuel stations along the defined path, or the like.

In some examples, the control unit may be wirelessly connected to a central server. The control unit may send data to the central server with regard to mobile asset operating conditions, environmental conditions, and the like. The central server may include a processor, configured similarly to the control unit, and a database to which data may be stored. The processor may be configured to analyze, categorize, send, and receive data. The central server may be in communication with control units of a plurality of mobile assets, which may provide feedback in regards to emissions totals, fuel station locations, fuel availability, refueling wait times, and so on.

Regarding injection timing, more than diesel fuel is contemplated herein and the term is used to indicate aspects of fuel flow (both gas and liquid) into the cylinder relative to the combustion cycle. Thus, injection timing information may include a duration that a solenoid opens in the injector to ingress fuel into the cylinder, the pressure of the fuel being injected, the timing of the injection relative to the piston location in the cylinder, and the like. Additionally, injection timing may additionally refer to the fumigation or injection of gaseous fuel into the air intake valve for the cylinder. In this aspect, injection timing may refer to the flow rate of the gas, the volume of EGR in the manifold, the oxygen content (calculated or measured) in the manifold, and the like. Furthermore, the memory may store actual sensed/detected information from the above-mentioned sensors.

The algorithm facilitates the processing of signals from one or more of the plurality of sensors. The characteristic profiles associated with the mobile asset may include the output from the sensors and information stored in the memory.

The processor may include a range of circuitry types, such as a microprocessor, a programmable logic controller, a logic module, etc. The processor in combination with the algorithm may perform the various computational operations relating to determination of a combustion ratio of the plurality of fuels to be delivered to at least some cylinders of the engine. The combustion ratio is determined by the ratio of the plurality of fuels delivered to cylinders of the engine. For an engine using diesel and natural gas, a combustion ratio would be ratio of diesel content to natural gas content to be delivered to each cylinder. As noted, the diesel content may be measured as an injection time and diesel pressure through an injector. The natural gas content may be measured by a flow rate through a gas valve as metered into an air intake stream. The ratio, then, could be selected as the energy content of each fuel component present in a cylinder during combustion. Alternatively, other calculations may be used to form the ratio.

The processor may determine the fuel combustion ratio of the plurality of the fuels associated with each engine cylinder of the mobile asset based on the plurality of characteristic profiles. In some embodiments, the processor determines the combustion ratio based on the output from the sensors 40, 42, 44, 46, 48, 50 and 52. In certain other embodiments, the processor 58 determines the combustion ratio based on the output from the GPS 53. In a specific embodiment, the processor 58 utilizes information from the GPS 53 in conjunction with the information from the other sensors 40, 42, 44, 46, 48, 50 and 52 to determine the combustion ratio. Additionally, the processor 58 may also use the information stored in the memory 54.

In the illustrated embodiments, the mobile asset has a first fuel source 60 and a second fuel source 62 for feeding a first fuel and a second fuel respectively, to corresponding cylinders of the engine. The first and second fuels may be injected to the cylinders via the intake manifold or may be injected directly to the cylinders, or a combination of both or other ingress techniques. More than two fuels may be used.

The first fuel source 60 may be stored in a first fuel storage container and the second fuel source 62 may be stored in a second fuel storage container. The first fuel storage container may be fluidly separated from the second fuel storage container. The first fuel storage container may be configured to store a liquid fuel and the second fuel storage container may be configured to store a gaseous fuel. In some examples, additional fuel storage containers may be included in a fuel system of the mobile asset and configured to store other fuels.

The processor outputs a control signal to the fuel delivery system to deliver the plurality of fuels to the cylinders based on, at least partially, the combustion ratio. The combustion ratio may be determined to maintain a plurality of actual values associated with usage of the plurality of fuels relative to defined corresponding threshold values. In one embodiment, an actual cost associated with usage of the plurality of fuels may be maintained to less than or equal to a defined threshold cost; an actual emission level associated with usage of the plurality of fuels may be maintained to less than or equal to a defined threshold emission level; and, an actual quantity of fuel in the mobile asset may be maintained to less than or equal to a defined threshold quantity. The fuel controlling unit may control fuel utilization, and the ratio of use of the plural fuels relative to each other, based on cost and availability while ensuring emission compliance along the entire travel from the first operating point to the second operating point along the defined path. For example, if two fuels are used, the controlling unit may control a relatively larger usage of a secondary fuel and so that adequate primary fuel exists to complete the travel, taking into consideration the characteristics profiles.

Relative costs, purity, type and availability of different fuels may be in flux. Also, proportions of different fuels may also have an effect on the exhaust constituents from the engine. In one embodiment, the fuel controlling unit takes into consideration sensed engine emission level, a fuel usage level (i.e. quantity of fuel required for the travel, remaining quantity of fuel in the fuel sources 60, 62) the engine power output, the engine load, the engine speed, fuel cost, and the fuel injection profile. In an embodiment, the fuel controlling unit may consider distance from the first operating point to the second operating point along the defined path, terrain profile associated with the path, ambient temperature and pressure, time desired to traverse the distance, and location of one or more fuel stations along the defined path, or the like. Other suitable parameters may be also envisaged.

Parameters may vary dynamically as a function of time and location of the mobile asset. In accordance with an embodiment, the plurality of characteristic profiles associated with the mobile asset may be determined as a function of time and a corresponding location of the mobile asset along the defined path. Hence, the fuel controlling unit may also determine the fuel combustion ratio as a function of time and a corresponding location of the mobile asset based on the one or more of the plurality of characteristic profiles. The frequency of sensing the characteristics profiles and determination of the combustion ratio may be based on the type of application.

In certain embodiments, the control unit may output data to a user interface 64. The user interface may facilitate inputs via a touch screen 66 from a user to the control unit and provide a mechanism through which a user can manipulate data and sensed properties from the control unit. The user interface may include a command line interface, menu driven interface, and/or graphical user interface. The control unit may be operable to adjust the combustion ratio affecting the cost and engine emissions associated with the fuel usage. In some embodiments, the control unit may communicate to a user via the user interface whether it may be possible to reach a predetermined destination with available of fuel(s) in the asset, while meeting emissions targets and cost targets.

As described above, the control unit may measure a plurality of engine parameters based on output from a variety of sensors, including but not limited to fuel injection timing sensors, fuel flow sensors, throttle position sensors, manifold air pressure sensors, manifold air temperature sensors, exhaust gas temperature sensors, engine power sensors, knock sensors or the like. Thus, in non-limiting examples, the measured engine parameters may comprise at least one of engine speed, engine load, engine throttle position, intake manifold temperature, intake manifold pressure, exhaust gas flow rate and temperature, air flow into the cylinder, compression ratio, or intake and exhaust valve timing.

In other embodiments, examples of other engine parameters may comprise a status of one or more sensors. For example, a measured engine parameter may comprise if a particular sensor (e.g., knock sensor, temperature sensor, etc.) is degraded or not operating correctly.

In still another embodiment, another engine parameter may comprise an aftertreatment status. The aftertreatment status may comprise temperature, flow, and/or pressure drop of a predetermined quantity, whether the aftertreatment is regenerating, measured engine operation over time, anticipated regeneration start event, estimated collection of combustible substances in the aftertreatment system, and the like.

Figure 3:
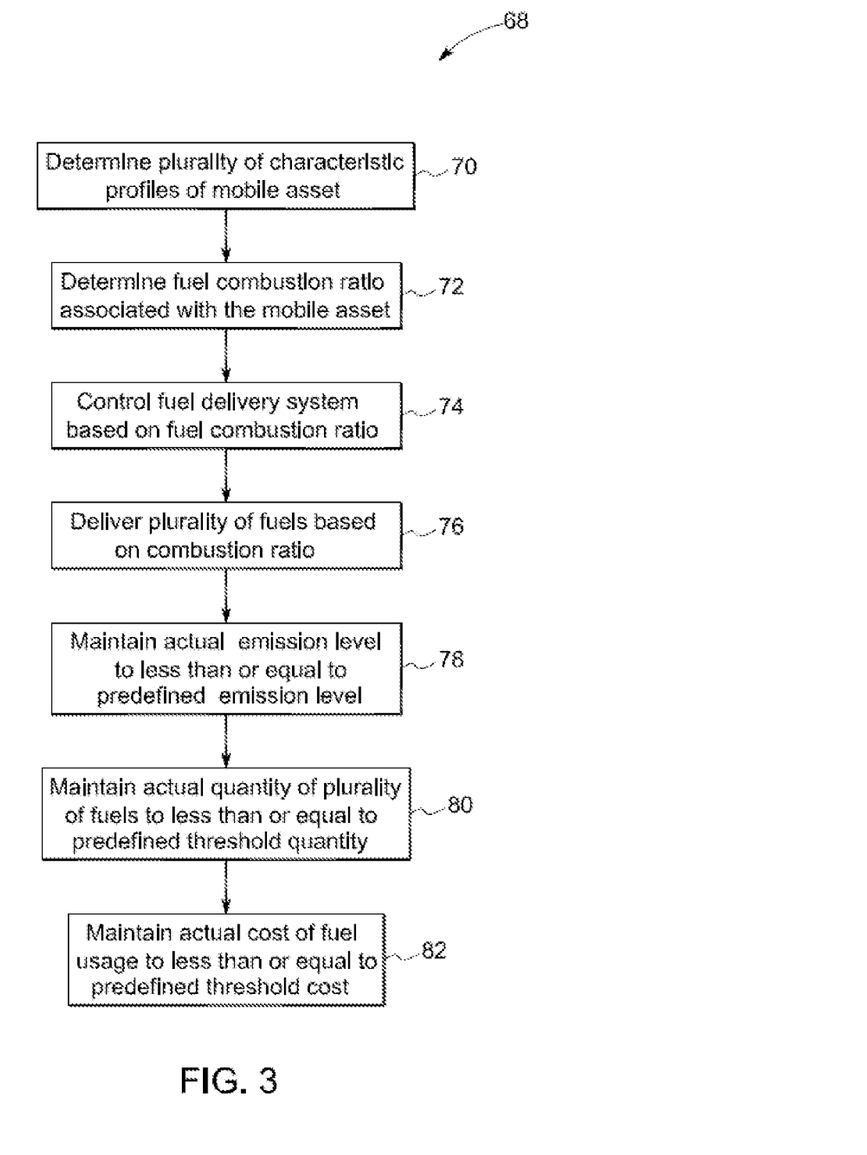
FIG. 3 is a flow diagram illustrating exemplary steps involved in optimization of fuel in a mobile asset in accordance with an exemplary embodiment of the present technique.

Referring to FIG. 3, a flow diagram 68 illustrating a plurality of steps involved in optimization of fuel for a mobile asset may be disclosed. Initially, a plurality of characteristic profiles associated with the mobile asset moving from one operating point to another operating point along a defined path may be determined as represented by the step 70. In one embodiment, the characteristic profiles may include asset sensed information, the characteristics profiles may include GPS information, the characteristics profile may include memory stored information, and the characteristics profile may be determined as a function of time and location of the mobile asset. In one example, the plurality of characteristic profiles comprises one or more of global positioning sensor (GPS) information for the location of the mobile asset, a calculated distance from a current location of the mobile asset to a fuel station, a fuel cost for one or more of the plurality of fuels, a terrain profile associated with a location on the defined path, or an ambient temperature or ambient pressure proximate to the mobile asset. On an example, the plurality of characteristic profiles may include two of the above parameters. In an alternate or additional example, the plurality of characteristic profiles comprises at least one asset sensed information comprising at least one of an engine emission level, a fuel usage level, a power output, an engine load, an engine speed, or a fuel injection profile.

Then, a fuel combustion ratio of the plurality of the fuels associated with at least one engine cylinder of the mobile asset may be determined based on the plurality of characteristic profiles as represented by the step 72. The fuel combustion ratio refers to a ratio of the plurality of fuels to be delivered to the at least one engine cylinder of the mobile asset, and may be determined as a function of time and location of the mobile as set.

A fuel delivery system may be controlled based on the determined fuel combustion ratio as represented by the step 74. The fuel delivery system delivers the plurality fuels based on the determined fuel combustion ratio as represented by the step 76. As a result, the actual emission level associated with usage of the plurality of fuels may be maintained to less than or equal to a defined threshold emission level as represented by the step 78. For example, a measured exhaust emission constituent level may be controlled relative to a defined threshold emission level. An actual quantity of the plurality of fuels in the mobile asset may be maintained less than or equal to a defined threshold quantity as represented by the step 80. The actual cost associated with usage of the plurality of fuels may be maintained to less than or equal to a defined threshold cost as represented by the step 82.

In some examples, along a defined path, the defined threshold emission level may change at different geofenced areas of the path. For example, if the defined path includes a city and a rural area, then the defined threshold emission level may be lower in the city or may be directed toward different emissions in the city compared to the rural area. Thus, in some examples, sections of the defined path may include increasing the actual cost of fuel usage to a cost greater than the predefined threshold cost. The increased cost may be offset by lower costs at other locations of the defined path such that an average cost of fuel usage is less than or equal to the predefined threshold cost.

In some examples, a user may be provided an option to adjust fueling parameters based on operation of other mobile assets within a geofenced location. For example, if a predefined threshold emission level of the geofenced location is being exceeded by a plurality of mobile assets then it may be desired to adjust fueling parameters of one or more of the mobile assets to decrease a particular emission type. For example, if ammonia emissions in the geofenced location are greater than the predefined threshold emission level, then it may be desired to reduce ammonia consumption in a plurality of mobile assets. A processor of the central server may determine a lowest average cost to switch fuel usage across each of the plurality of mobile assets. In one example, despite the average cost being less than the predefined threshold cost, the cost associated with fuel usage may increase above the predefined threshold cost in some of the mobile assets. In one example, the user in each of the mobile assets in which the cost increases above the predefined threshold cost may be presented an option to adjust fueling parameters to parameters where the associated cost is above the predefined threshold cost. If the user agrees to increase the fuel usage costs, then the method may include providing the user credits to an account or a profile thereof that may be applied to maintenance, repairs, components, and the like. If the user declines to increase the fuel usage cost and selects a different fueling configuration, then another mobile asset may be forced to adjust fueling parameters to parameters associated with a higher cost, which may increase the overall average fuel cost across the plurality of mobile assets.

Figure 4:
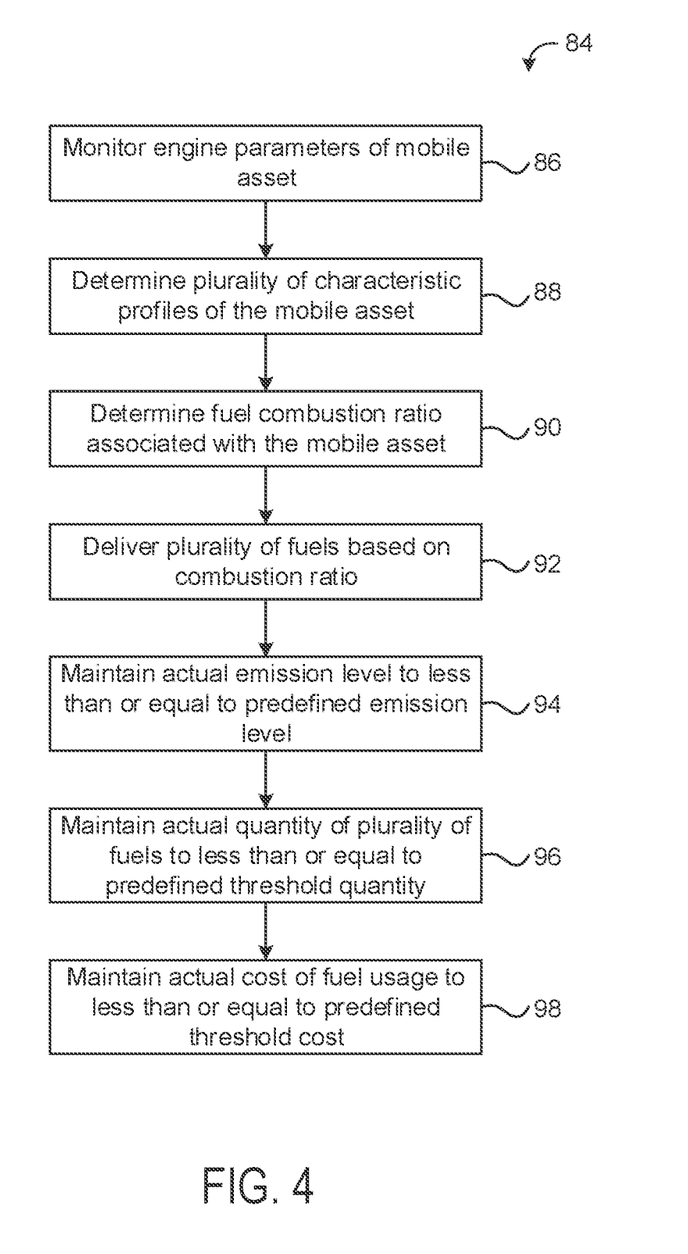
FIG. 4 is a flow diagram illustrating exemplary steps involved in optimization of fuel in a mobile asset in accordance with an exemplary embodiment of the present technique.

Referring to FIG. 4, a flow diagram 84 illustrating a plurality of steps involved in optimization of fuel for a mobile asset may be disclosed. A plurality of engine parameters may be monitored as represented by the step 86, including measuring the engine parameters via one or more sensors and/or calculating or estimating the engine parameters. The measured engine parameters may include engine speed, engine load, engine throttle position, intake manifold temperature, intake manifold pressure, exhaust gas flow rate and temperature, air flow into the cylinder, compression ratio, intake and exhaust valve timing, sensor status (e.g., knock sensor status), and aftertreatment status.

A plurality of characteristic profiles associated with the mobile asset moving from one operating point to another operating point along a defined path may be determined as represented by the step 88. In one embodiment, the characteristic profiles may include asset sensed information, the characteristics profiles may include GPS information, the characteristics profile may include memory stored information, and the characteristics profile may be determined as a function of time and location of the mobile asset. In one example, the plurality of characteristic profiles comprises one or more of global positioning sensor (GPS) information for the location of the mobile asset, a calculated distance from a current location of the mobile asset to a fuel station, a fuel cost for one or more of the plurality of fuels, a terrain profile associated with a location on the defined path, or an ambient temperature or ambient pressure proximate to the mobile asset. In an example, the plurality of characteristic profiles may include two of the above parameters. In an alternate or additional example, the plurality of characteristic profiles comprises at least one asset sensed information comprising at least one of an engine emission level, a fuel usage level, a power output, an engine load, an engine speed, or a fuel injection profile. In a further example, the plurality of characteristic profiles may additionally or alternatively comprise one or more of historical operational data or ambient conditions along the defined path. The historical operational data may include historical fuel usage levels for the plurality of fuels supplied to the engine in order to traverse the defined path, historical ambient conditions (e.g., historical pressure and temperature), historical path conditions (e.g., track wear), and/or other operational data.

Then, a fuel combustion ratio of the plurality of the fuels associated with at least one engine cylinder of the mobile asset may be determined based on the measured engine parameters and the plurality of characteristic profiles as represented by the step 90. The fuel combustion ratio refers to a ratio of the plurality of fuels to be delivered to the at least one engine cylinder of the mobile asset, and may be determined as a function of time and location of the mobile asset.

A fuel delivery system may be controlled based on the determined fuel combustion ratio. The fuel delivery system delivers the plurality fuels based on the determined fuel combustion ratio as represented by the step 92. As a result, the actual emission level associated with usage of the plurality of fuels may be maintained to less than or equal to a defined threshold emission level as represented by the step 94. An actual quantity of the plurality of fuels in the mobile asset may be maintained less than or equal to a defined threshold quantity as represented by the step 96. The actual cost associated with usage of the plurality of fuels may be maintained to less than or equal to a defined threshold cost as represented by the step 98.

In one example, one of the one or more monitored engine parameters includes an increased load operation of the engine. The increased load operation may include a transient acceleration operation. During the transient acceleration operation, the fuel combustion ratio may be adjusted to avoid knock, for example. In an example, the quantity of a first fuel may be reduced and the quantity of the second fuel may be increased.

In an example, the increased load operation may include or be due to an increased gradient of the path at the mobile asset current location. In one example, the control unit may determine in advance that an increased gradient is coming up along the path and then pre-stage the engine to anticipate the increased load. The pre-staging may include switching hardware configurations of the engine. The hardware configurations that may be switched include one or more of a valve event (e.g., adjusting one or more of timing, lift, or duration of an intake and/or exhaust valve), compression ratio, piston, piston ring, valve lift profile, pressure sensor, temperature sensor, knock sensor, injector, and injector nozzle.

In a further example, one of the one or more monitored engine parameters includes an aftertreatment status where the aftertreatment system may experience degradation as a result of a sudden increase in temperature beyond a limited temperature (e.g., temperature point, rate of rise, etc.). This may be in conjunction with extended idle or cold operation. For example, the status of the aftertreatment may be that the aftertreatment has accumulated a large amount of flammable material including oil, unburned fuel, and/or particulate. Alternatively, the status of the aftertreatment may be that it is at a relatively low temperature and would suffer from extreme thermal stresses in the event of a sudden increase in temperature. In this embodiment, the fueling may be adjusted such that the temperature of the aftertreatment is controlled to mitigate degradation.

In an example, one of the one or more monitored engine parameters includes a sensor status for a temperature sensor or a knock sensor. For example, if a particular sensor (e.g., knock sensor, temperature sensor, etc.) is broken or not operating correctly, the fuel combustion ratio may be adjusted to proactively prevent knocking that might otherwise go undetected.

In an example, one of the one or more monitored engine parameter comprises increased engine speed. During the increased engine speed operation, the fuel combustion ratio may be adjusted to avoid knock, for example. In an example, the quantity of a first fuel may be reduced and the quantity of the second fuel may be increased.

In one example, a method may include strategizing a refueling location and timing based on fuel costs at various fuel stations along the defined path or paths frequently traveled by the mobile asset. The method may further include adjusting a combustion ratio to increase likelihood of refueling at the fuel stations where a fuel cost is less than or equal to an average fuel cost. In one example, the strategizing may include strategizing only for secondary fuels of the mobile asset. For example, if the mobile asset combusts diesel and ammonia, then the strategizing may include adjusting the combustion ratio to increase a likelihood of an ammonia refueling request to occur proximally to a fuel station selling ammonia equal to or less than the average ammonia cost. The average ammonia cost may be based on costs along the path, within the geofenced location, region-wide, nationwide, or internationally.

As another example, the strategizing may be based on primary fuels and secondary fuels. For example, if the mobile asset is configured to combust diesel and HDRD as primary fuels and ammonia and hydrogen as secondary fuels, then the combustion ratio may be adjusted to increase the likelihood of the refueling request to occur proximally to a desired station (e.g., a fuel station with a fuel cost less than or equal to the average fuel cost). For example, if the combustion ratio includes a first ratio of HDRD and ammonia and the HDRD fuel level is relatively low, then the combustion ratio may be adjusted to decrease HDRD and increase ammonia. In one example, a relatively low fuel level may correspond to a fuel level where the current amount of fuel is insufficient to propel the mobile asset to the desired fuel station based on a current fuel economy. Additionally or alternatively, diesel and/or hydrogen may be introduced to further decrease HDRD consumption.

In one example, the method includes adjust the combustion ratio between two or more of gasoline, diesel, hydrogenation-derived renewable diesel (HDRD), alcohol, ammonia, biodiesels, hydrogen, natural gas, kerosene, syn-gas, and propane. If fueling stations nearby sell biodiesel at a price greater than the average biodiesel price, then the method may include adjusting the combustion ratio to reduce biodiesel consumption and increase consumption of another fuel. The reduction may be proportional to a distance between the mobile asset and a fuel station selling biodiesel at less than or equal to the average biodiesel price. The distance may be based on a current distance to the fuel station or an anticipated distance travelled prior to reaching the fuel station. The anticipated distance travelled may be based on an expected path or paths travelled prior to the mobile asset arriving at the fuel station. For example, the operator may desire traveling to other destinations prior to reaching the fuel station. In this way, the anticipated distance travelled may be greater than the current distance.

Additionally or alternatively, if a wait time at a fueling station comprising a fuel at less than or equal to the average fuel price is greater than a desired wait time, then the method may include adjusting the combustion ratio to decrease consumption of the fuel. The decrease may be proportional to anticipated time in which the wait time is less than or equal to the desired wait time. In one example, the desired wait time is equal to an average wait time at the fuel station, wherein the average wait time is determined based on feedback from a plurality of mobile assets and/or the fuel station. Additionally or alternatively, the desired wait time may be defined by an operator.

In one embodiment, a method includes determining a plurality of characteristic profiles associated with a mobile asset moving from a first operating point to a second operating point along a defined path. A fuel combustion ratio is determined for the plurality of the fuels associated with at least one engine cylinder of the mobile asset based on the plurality of characteristic profiles so as to maintain a plurality of actual values associated with usage of the plurality of fuels to less than or equal to defined corresponding threshold values. The fuel combustion ratio is a ratio of the plurality of fuels to each other, and may be calculated in one of several ways depending on the application. As used here, suitable determination methods may include by measured volume, mass, flow rate, injection time, and the like, and may take into account purity, energy density, the presence, type and quantify of fuel additives, environmental considerations, EGR content, and the like. A fuel delivery system of the mobile asset may deliver the plurality of fuels to the at least one engine cylinder based on the fuel combustion ratio.

In an example, a fuel system includes a fuel controlling unit configured to deliver a plurality of differing fuels to at least one engine cylinder of an engine based at least in part on a fuel combustion ratio, wherein the fuel combustion ratio comprises a ratio of the plurality of fuels to be delivered to the at least one engine cylinder and is based at least in part on one or more of a plurality of characteristic profiles along a defined path of a mobile asset in which the engine is disposed, wherein the fuel combustion ratio comprises a ratio of the plurality of fuels to be delivered to the at least one engine cylinder, and the plurality of characteristic profiles comprises one or more of global positioning sensor (GPS) information for the location of the mobile asset, a calculated distance from a current location of the mobile asset to a fuel station, a fuel cost for one or more of the plurality of fuels, a terrain profile associated with a location on the defined path, or an ambient temperature or ambient pressure proximate to the mobile asset.

The system may further comprise one or more sensors operable to communicate sensor information with the fuel controlling unit sensor information, and the fuel controlling unit may be operable to receive the sensor information and thereby to determine the one or more of the plurality of characteristic profiles. The fuel controlling unit may be configured to signal a fuel demand to a regasification unit to supply at least one of the plurality of fuels. The fuel controlling unit may be configured to maintain an actual quantity of at least one of the plurality of fuels in the mobile asset to less than or equal to a defined threshold quantity for that fuel. The plurality of characteristic profiles may further comprise one or more of historical operational data or ambient conditions along the defined path. In an example, the mobile asset in which the engine is disposed is a vehicle. In an example, the vehicle is a rail vehicle, and the plurality of differing fuels include diesel and natural gas.

In one example, the disclosure provides support for a method for operating an engine configured to use a plurality of differing fuels, the method comprising determining a fuel combustion ratio of the plurality of differing fuels associated with at least one engine cylinder of the engine based at least in part on a plurality of characteristic profiles along a defined path of a mobile asset in which the engine is disposed, wherein the fuel combustion ratio comprises a ratio of the plurality of differing fuels to be delivered to the at least one engine cylinder, and the plurality of characteristic profiles comprises at least one respective calculated distance from a current location of the mobile asset to at least one fuel station and at least one fuel cost for one or more of the plurality of differing fuels, monitoring fuel levels of the plurality of differing fuels, and adjusting the fuel combustion ratio of the plurality of differing fuels in response to a fuel level of a fuel of the plurality of differing fuel being less than a threshold fuel level and the at least one respective calculated distance being greater than a threshold distance. A first example of the method may further include where the at least one calculated distance comprises plural calculated distances, the at least one fuel station comprises plural fuel stations, the calculated distances are from the current location of the mobile asset to the plural fuel stations, respectively, and the at least one fuel cost comprises plural fuel costs for the plurality of differing fuels at the plural fuel stations. A second example of the method, optionally including the first example, may further include where the plurality of characteristic profiles comprises at least one asset sensed information comprising at least one of an engine emission level, a fuel usage level, a power output, an engine load, an engine speed, or a fuel injection profile and wherein the predetermined condition of the aftertreatment device includes the aftertreatment device temperature being below a second threshold temperature. A third example of the method, optionally including one or more of the previous examples, may further include where the at least one fuel cost is equal to an average fuel cost, and wherein the at least one fuel station from which the at least one respective calculated distance is measured sells one or more of the plurality of differing fuels at or below the average fuel cost. A fourth example of the method, optionally including one or more of the previous examples, may further include where the threshold fuel level is based on an amount of the fuel used to propel the mobile asset the at least one respective calculated distance. A fifth example of the method, optionally including one or more of the previous examples, may further include where adjusting the fuel combustion ratio comprises increasing consumption of fuels with fuel levels greater than corresponding threshold fuel levels and decreasing consumption of the fuel with the fuel level less than the threshold fuel level. A sixth example of the method, optionally including one or more of the previous examples, may further include where the plurality of differing fuels comprises two or more of gasoline, diesel, hydrogenation-derived renewable diesel (HDRD), alcohol, ammonia, biodiesels, hydrogen, natural gas, kerosene, syn-gas, and propane, further comprising where the fuel combustion ratio comprises combustion of a gaseous fuel and a liquid fuel.

An embodiment of a system comprises a mobile asset comprising a multi-fuel engine configured to combust a plurality of different fuels, a plurality of fuel storage devices configured to store each of the plurality of different fuels separately, a plurality of fuel level sensors coupled to each of the plurality of fuel storage devices, and a controller comprising instructions stored on non-transitory memory thereof that when executed cause the controller to monitor fuel levels of the plurality of different fuels, determine a plurality of distances between the mobile asset and a plurality of fuel stations, compare each fuel level of the plurality of different fuels to a corresponding threshold fuel level, wherein the corresponding threshold fuel level is based on a distance from the mobile asset to a fuel station comprising the fuel, and adjust a combustion ratio of the plurality of different fuel in response to a fuel level being less than a corresponding threshold fuel level. A first example of the system further includes where the combustion ratio includes at least two or more of the plurality of different fuels, wherein the plurality of fuels comprises gasoline, diesel, hydrogenation-derived renewable diesel (HDRD), alcohol, ammonia, biodiesels, hydrogen, natural gas, kerosene, syn-gas, and propane. A second example of the system, optionally including the first example, further includes where the combustion ratio includes at least one liquid fuel and at least one gaseous fuel, wherein the instructions cause the controller to decrease consumption of a first gaseous fuel and increase consumption of a second gaseous fuel different than the first gaseous fuel. A third example of the system, optionally including one or more of the previous examples, further includes where the instructions further enable the controller to display an option to an operator via a display device maintain the combustion ratio in response to the fuel level being less than the corresponding threshold fuel level. A fourth example of the system, optionally including one or more of the previous examples, further includes where the mobile asset is propelled to a fuel station comprising the fuel, and wherein a cost of the fuel is greater than an average fuel cost. A fifth example of the system, optionally including one or more of the previous examples, further includes where the mobile asset is one of a plurality of mobile assets, and wherein the combustion ratio is adjusted further based on emissions of the plurality of mobile assets. A sixth example of the system, optionally including one or more of the previous examples, further includes where emissions of the plurality of mobile assets are determined for each of the plurality of different fuels being combusted and compared to corresponding emissions targets. A seventh example of the system, optionally including one or more of the previous examples, further includes where each of the plurality of distances comprises a current distance and an anticipated distance to a fuel station of the plurality of fuel stations comprising a fuel identical to a fuel of the mobile asset present at less than the corresponding threshold fuel level.

An embodiment of a method for operating a multi-fuel engine of a mobile asset, the method includes adjusting a fuel combustion ratio in response to a fuel level of a fuel being less than a threshold fuel level and a distance from the mobile asset to a fuel station comprising the fuel at a price less than or equal to an average fuel cost being greater than a threshold distance. A first example of the method further includes where the threshold fuel level is based on an amount of the fuel used to travel the threshold distance. A second example of the method, optionally including the first example, further includes where adjusting the fuel combustion ratio further comprises adjusting one or more of a liquid fuel and a gaseous fuel being combusted by the multi-fuel engine. A third example of the method, optionally including one or more of the previous examples, further includes where the fuel combustion ratio includes a primary fuel and a secondary fuel, and wherein adjusting the fuel combustion ratio comprises decreasing usage of a first primary fuel and increasing usage of a second primary fuel in response to the fuel level of the first primary fuel being less than the threshold fuel level. A fourth example of the method, optionally including one or more of the previous examples, further includes where the fuel combustion ratio comprises at least one of hydrogenation-derived renewable diesel (HDRD), alcohol, ammonia, biodiesels, hydrogen, and natural gas.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, and to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for operating an engine configured to use a plurality of differing fuels, the method comprising:
   determining a fuel combustion ratio of the plurality of differing fuels associated with at least one engine cylinder of the engine based at least in part on a plurality of characteristic profiles along a defined path of a mobile asset in which the engine is disposed, wherein the fuel combustion ratio comprises a ratio of the plurality of differing fuels to be delivered to the at least one engine cylinder, and the plurality of characteristic profiles comprises at least one respective calculated distance from a current location of the mobile asset to at least one fuel station and an average fuel cost for one or more of the plurality of differing fuels based on a plurality of fuel costs provided by a plurality of fuel stations;
   monitoring fuel levels of the plurality of differing fuels; and
   adjusting the fuel combustion ratio of the plurality of differing fuels in response to a fuel level of a carbon-free fuel of the plurality of differing fuels being less than a threshold fuel level and the at least one respective calculated distance to the at least one fuel station including the carbon-free fuel at a cost less than or equal to the average fuel cost being greater than a threshold distance.

2. The method of claim 1, wherein the plurality of characteristic profiles comprises at least one asset sensed information comprising at least one of an engine emission level, a fuel usage level, a power output, an engine load, an engine speed, or a fuel injection profile.

3. The method of claim 1, wherein the at least one fuel cost is equal to an average fuel cost based on fuel costs at a plurality of fuel stations including the at least one fuel station, and wherein the at least one fuel station from which the at least one respective calculated distance is measured sells one or more of the plurality of differing fuels at or below the average fuel cost.

4. The method of claim 1, wherein the threshold fuel level is based on an amount of the fuel used to propel the mobile asset the at least one respective calculated distance.

5. The method of claim 1, wherein adjusting the fuel combustion ratio further comprises increasing consumption of carbon-containing fuels with fuel levels greater than corresponding threshold fuel levels and decreasing consumption of carbon-containing fuels with the fuel level less than the threshold fuel level.

6. The method of claim 1, wherein the plurality of differing fuels comprises two or more of gasoline, diesel, hydrogenation-derived renewable diesel (HDRD), alcohol, ammonia, biodiesels, hydrogen, natural gas, kerosene, syngas, ether, and propane, further comprising where the fuel combustion ratio comprises combustion of a gaseous fuel and a liquid fuel.

7. A system, comprising:
   a mobile asset comprising a multi-fuel engine configured to combust a plurality of different fuels;
   a plurality of fuel storage devices configured to store each of the plurality of different fuels separately;
   a plurality of fuel level sensors coupled to each of the plurality of fuel storage devices; and
   a controller comprising instructions stored on non-transitory memory thereof that when executed cause the controller to:
      monitor fuel levels of the plurality of different fuels;
      determine a plurality of distances between the mobile asset and a plurality of fuel stations;
      compare fuel levels of carbon-free fuels of the plurality of different fuels to a corresponding threshold fuel level, wherein the corresponding threshold fuel level is based on a volume of carbon-free fuel used to travel a distance from the mobile asset to a fuel station comprising the carbon-free fuel; and
      adjust a combustion ratio of the plurality of different fuels in response to a fuel level being less than a corresponding threshold fuel level and a distance between the mobile asset and a fuel station including the carbon-free fuel at a cost less than an average cost being greater than a threshold distance, wherein the average cost is determined based on a cost of the carbon-free fuel at the plurality of fuel stations.

8. The system of claim 7, wherein the instructions further enable the controller to display an option to an operator via a display device to maintain the combustion ratio in response to the fuel level of the carbon-free fuel being less than the corresponding threshold fuel level.

9. The system of claim 8, wherein the mobile asset is propelled to a fuel station including the carbon-free fuel sold at a cost greater than the average fuel cost based on an emission compliance.

10. The system of claim 7, wherein the mobile asset is one of a plurality of mobile assets, and wherein the combustion ratio is adjusted further based on emissions of the plurality of mobile assets.

11. The system of claim 10, wherein emissions of the plurality of mobile assets are determined for each of the plurality of different fuels being combusted and compared to corresponding emissions targets.

12. The system of claim 7, wherein the combustion ratio includes at least two or more of the plurality of different fuels, wherein the plurality of fuels comprises gasoline, diesel, hydrogenation-derived renewable diesel (HDRD), alcohol, ammonia, biodiesels, hydrogen, natural gas, kerosene, syn-gas, ether, and propane.

13. The system of claim 7, wherein the combustion ratio includes at least one liquid fuel and at least one gaseous fuel, wherein the instructions cause the controller to decrease consumption of a first gaseous fuel and increase consumption of a second gaseous fuel different than the first gaseous fuel.

14. A method for operating a multi-fuel engine of a mobile asset, the method, comprising:

adjusting a fuel combustion ratio in response to a fuel level of a carbon-free fuel being less than a threshold fuel level and a distance from the mobile asset to a fuel station including the carbon-free fuel at a price less than or equal to an average fuel cost being greater than a threshold distance, the average fuel cost based on a cost of the carbon-free fuel at a plurality of fuel stations.

15. The method of claim 14, wherein the fuel combustion ratio includes a primary fuel and a secondary fuel, and wherein adjusting the fuel combustion ratio comprises decreasing usage of a first secondary fuel and increasing usage of a second secondary fuel in response to the fuel level of the first secondary fuel being less than the threshold fuel level.

16. The method of claim 15, wherein the fuel combustion ratio comprises at least one of hydrogenation-derived renewable diesel (HDRD), alcohol, ammonia, biodiesels, hydrogen, and natural gas as the secondary fuel.

17. The method of claim 14, wherein the threshold fuel level is based on an amount of the carbon-free fuel used to travel the threshold distance.

18. The method of claim 14, wherein adjusting the fuel combustion ratio further comprises adjusting one or more of a liquid fuel and a gaseous fuel being combusted by the multi-fuel engine.

* * * * *